F. J. SCHUMANN.
WORK HOLDER.
APPLICATION FILED DEC. 21, 1915.
1,360,449.
Patented Nov. 30, 1920.
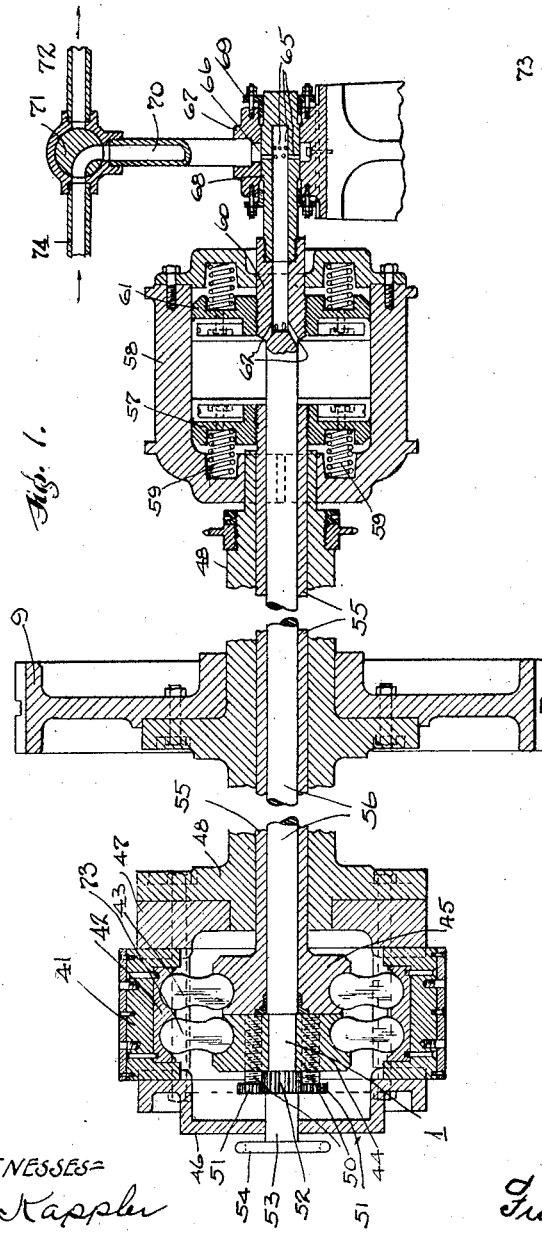
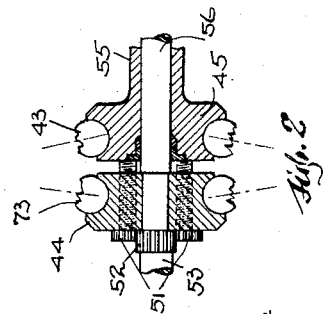
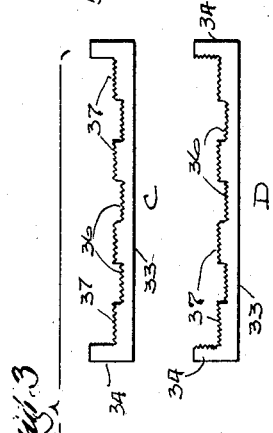
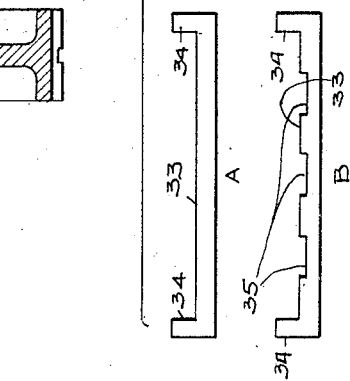
WITNESSES
O. M. Kappler
Thos. H. Fay
INVENTOR
Frank J. Schumann
BY Fay, Oberlin & Fay
ATTORNEYS

UNITED STATES PATENT OFFICE.

FRANK J. SCHUMANN, OF CLEVELAND, OHIO, ASSIGNOR, BY MESNE ASSIGNMENTS, TO THE STANDARD PARTS COMPANY, OF CLEVELAND, OHIO, A CORPORATION OF OHIO.

WORK-HOLDER.

1,360,449.     Specification of Letters Patent.     Patented Nov. 30, 1920.

Application filed December 21, 1915. Serial No. 68,003.

*To all whom it may concern:*

Be it known that I, FRANK J. SCHUMANN, a citizen of the United States, and a resident of Cleveland, county of Cuyahoga, and State of Ohio, have invented a new and useful Improvement in Work-Holders, of which the following is a specification, the principle of the invention being herein explained and the best mode in which I have contemplated applying that principle, so as to distinguish it from other inventions.

The present improvements relate to an expanding mandrel or work holder suitable for a variety of uses but particularly adapted to a band grooving machine designed to receive a band and to machine the same, at the same time sizing and testing the band for strength. The adaptation of my invention, which is here illustrated, is that of a machine adapted for machining a rim to be used on a truck wheel for heavy vehicles. In such an article various cuts must be made to properly form the surface, while the rim must be securely held and rotated during the operation. In the present machine I have provided means for accomplishing this result with improved mechanism for also carrying out the operations mentioned above, and adding convenience and safety to the operation. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Figure 1 is a longitudinal vertical section of the band-receiving mandrel and associated parts in a machine embodying the present improvements; Fig. 2 is a section through such mandrel showing the parts in a different operative position; and Fig. 3 is a view illustrating the rim in successive stages of manufacture following the several operations performed on it in the machine.

It is deemed unnecessary to illustrate the general construction of the machine, the essential part of which, so far as the operations of present interest are concerned, being an expanding mandrel whereon the bands or rims are designed to be carried while they are operated upon by suitable tools, as in an ordinary lathe. It will be understood that in the manufacture of such bands or rims the stock is first formed annular, then the ends welded together and the weld deburred. As a result the article is of elliptical form and slightly too small in diameter. One of the objects of the present machine is to provide a mandrel which will be capable of expanding and sizing such a rim or band, as well as holding the same during the machining operations which follow.

The general character of these machining operations is indicated in Fig. 3. The rim as it comes to the machine is shown at A and will be seen to be a flat band 33 having an upturned flange 34 at either side. The first operation upon this band is to cut the grooves 35 and to face off the edges of the flanges 34, and the rim shown at B in Fig. 5 is a rim upon which this operation has been performed. One of the turrets carries tools along one side which are adapted to cut the notches shown, while the opposite turret carries the facing tools. The next operation is to thread or serrate the notched portion of the band and also the main operation as shown at 36 and 37, respectively, in C of Fig. 3, and each of the turrets performs one of these operations although they are carried out simultaneously, and constitute the second operation in the manufacture of this rim. The last operation on the rim is to serrate the sides of the flanges 34, and this is shown in D, one turret operating upon one side and the other turret upon the other side.

The expanding mandrel is shown in Figs. 1 and 2, and consists of a plurality of segmental blocks 41 within which there is mounted a liner 42 provided with two semispherical recesses adapted to pivotally receive the outer ends of two series of links or toggle arms 43 and 73 which are positioned side by side and which are received at their other ends in two complementary collars or actuating blocks 44 and 45. The segmental blocks 41 are held between inner and outer plates 46 and 47 which secure these blocks from too great radial movement and act as a casing or housing for maintaining the blocks together. The mandrel is rotated through a plate 47 which is bolted to a sleeve 48 bearing the gear 9 which has already been referred to as being driven by the gears 6, 7 and 8 from the main driving shaft 5. Springs 95 are provided for the withdrawal of the blocks 41 in order to hold them tightly against the toggle arms 43 and 73.

The collar 44 is provided with a plurality of circularly disposed adjustable bolts 50 which are spaced at equal intervals and are provided at their extending ends with small gears 51, all of which are engaged by a single central gear 52 mounted upon and attached to a shaft 53 bearing a hand-wheel 54. By operating the hand-wheel all of the bolts are caused to be moved into or out of the collar 44 as desired, and may thus be extended beyond the inner face of this member and into a position where they will contact with the complementary collar 45 when these two members are moved toward each other for expanding the mandrel and engaging the work. This means is a very simple and accurate mechanism for limiting the diameter to which the mandrel is to be expanded, and it will thus be seen that my improved mandrel constitutes not only a work-holding mandrel or internal clutch, but also a sizing mechanism for gaging the internal diameter of the band or rim. In addition to this function of the mandrel the parts are made sufficiently strong, and the operating means are constructed with a sufficient leverage, to give a tremendous amount of radial thrust through each toggle arm, and thus the mechanism operates as a machine for testing the strength of the rim which is placed upon the mandrel before the rim is machined, since the first operation is to expand the mandrel to grip the stock. The amount of radial movement required of the segmental block is very slight and as the arms 43 and 73 approach parallelism their movement, and also the entire thrust transmitted through them, is practically entirely radial in its nature so that the entire power of the operating mechanism is directed outward and the resulting pressure on the blocks 41 and the rim thereon is very great.

The two members 44 and 45 are operated to move the segmental blocks radially outward by being moved axially with respect to each other, the block 45 being connected to a sleeve 55 within which there slides a shaft or sleeve 56 attached to the block 44. At its other end the sleeve 55 bears a piston 57 which is slidably mounted in a suitable casing or cylinder 58 which is mounted upon one end of the sleeve 48 which has already been described. The piston 57 is normally held spaced from the end of the cylinder 58 by means of a number of coiled springs 59 of which there will preferably be six arranged at equal intervals in order to secure movement of the piston 57 in a direction parallel to the shaft 56 upon which it slides. The shaft 56 is provided with an enlarged portion 60 which is hollowed out, and is engaged with a second piston 61 similar in its construction to the piston 67 and operating against the rear end of the cylinder 58. The hollow portion of the shaft 56 is provided with ports 62 leading to the inside of the cylinder 58 for the purpose of introducing fluid pressure thereinto to operate the two pistons 57 and 61 away from each other, thus producing relative axial movement between the two collars 44 and 45, causing engagement and disengagement of the clutch.

The hollowed out portion of the shaft 56 is provided with a number of lateral ports 65 opening into a passage 66 formed in a valve casing 67, this valve casing being slidably received on an enlarged portion 58 of the shaft 56, and there being packing disposed between the valve casing and the shaft on either side of such enlarged portion which is held in place by means of collars 69 in the usual manner. Fluid pressure is admitted to the passage 66 in the valve casing by means of a conduit 70 in which there is mounted a two-way valve 71 controlling communication of the conduit 70 with the discharge passage 72 and the inlet passage 74, the latter of which is connected to a suitable source of fluid pressure. It will be understood that the controlling valve 71 will be mounted in a convenient position for one of the operators.

From the foregoing description the operation of my improved machine will be evident, although it may be of advantage to briefly summarize the various steps. In the position shown in Fig. 1 the clutch is in its engaged position, the toggle arms 43 having been straightened out to force outward the segmental blocks 41. To disengage this clutch or mandrel it is therefore necessary to move the valve 71 to the discharge position, thus permitting the fluid pressure to flow from between the pistons 57 and 61 through the ports 62 and 65 and into the discharge port 72. As soon as this fluid pressure is exhausted, as it will be by reason of the action of the springs 59 operating upon the opposite sides of the two pistons, the latter will be moved together and will thus move the sleeve 55 to the right and the shaft 56 to the left. The collars 44 and 45 when so moved carry the inner ends of the toggle arms 43 apart, thus decreasing the radial extent of these arms and taking the pressure from off the segmental blocks 41. As soon as the pressure is removed from these blocks the rim may be readily knocked off from the mandrel and a new rim inserted.

The advantages of the present machine are the number of operations which are performed at a single time by the expanding mandrel, as this element not only sizes the rim, but tests it for strength, and also holds it firmly during the machining, and the simplicity of control both of the expanding mandrel and of the tool holders.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. An expanding mandrel comprising a plurality of segmental blocks, an inner support concentric with said blocks, two series of oppositely inclined toggle arms having their outer and inner ends bearing against said blocks and said support respectively, and means for swinging said arms about their ends toward a parallel relation, thereby forcing said blocks outward, said oppositely inclined series of toggles serving to balance the longitudinal component of the thrust of each series.

2. An expanding mandrel comprising a plurality of segmental blocks, two inner supports concentric with said blocks and axially movable with respect to each other, two series of oppositely inclined toggle arms, all having their outer ends bearing against said blocks and each series having the inner ends bearing against the adjacent one of said supports, and means for axially moving said supports with respect to each other, thereby forcing said blocks outward.

3. An expanding mandrel comprising a plurality of segmental blocks, two normally spaced and axially movable members disposed concentrically within said blocks, two series of oppositely inclined toggle arms, all having their outer ends bearing against said blocks, and each series having the inner ends of the arms thereof bearing against the adjacent one of said members, and means for moving said members toward each other, thereby forcing said blocks outward.

4. An expanding mandrel comprising a plurality of segmental blocks, two normally spaced and axially movable members disposed concentrically within said blocks, two series of oppositely inclined toggle arms, all having their outer ends bearing against said blocks, and each series having the inner ends of the arms thereof bearing against the adjacent one of said members, means for moving said members toward each other, and other means limiting such movement.

5. An expanding mandrel comprising a plurality of segmental blocks, two normally spaced and axially movable members disposed concentrically within said blocks, two series of oppositely inclined toggle arms, all having their outer ends bearing against said blocks, and each series having the inner ends of the arms thereof bearing against the adjacent one of said members, means for moving said members toward each other, and adjustable means limiting such movement.

6. An expanding mandrel comprising a plurality of segmental blocks, two normally spaced and axially movable members disposed concentrically within said blocks, two series of oppositely inclined toggle arms, all having their outer ends bearing against said blocks, and each series having the inner ends of the arms thereof bearing against the adjacent one of said members, means for moving said members toward each other, and a series of concentrically disposed adjustable bolts projecting from the inner face of one of said members and adapted to contact the other thereof, thereby limiting the movement of said members and regulating the radial movement of said blocks.

7. An expanding mandrel comprising a plurality of segmental blocks, two normally spaced and axially movable members disposed concentrically within said blocks, two series of oppositely inclined toggle arms, all having their outer ends bearing against said blocks, and each series having the inner ends of the arms thereof bearing against the adjacent one of said members, means for moving said members toward each other, a series of concentrically disposed, adjustable bolts projecting from the inner face of one of said members and adapted to contact the other thereof, and means for simultaneously adjusting said bolts.

8. An expanding mandrel comprising a plurality of segmental blocks, two normally spaced and axially movable members disposed concentrically within said blocks, two series of oppositely inclined toggle arms, all having their outer ends bearing against said blocks, and each series having the inner ends of the arms thereof bearing against the adjacent one of said members, means for moving said members toward each other, a series of concentrically disposed, adjustable bolts projecting from the inner face of one of said members and adapted to contact the other thereof, gears attached to said bolts, and a central gear engaging all of said gears for simultaneously adjusting said bolts.

9. An expanding mandrel comprising a plurality of segmental blocks, two normally spaced and axially movable members disposed concentrically within said blocks, two series of oppositely inclined toggle arms, all having their outer ends bearing against said blocks, and each series having the inner ends of the arms thereof bearing against the adjacent one of said members, and a fluid pressure means for moving said members toward each other.

10. An expanding mandrel comprising a plurality of segmental blocks, two normally spaced and axially movable members disposed concentrically within said blocks, two series of oppositely inclined toggle arms, all having their outer ends bearing against said blocks, and each series having the inner ends of the arms thereof bearing against the adjacent one of said members, and means for axially moving said members including concentric sleeves attached respectively to said members, a fluid pressure cylinder inclosing the same, and opposed pistons attached to said sleeves and slidably mounted in said cylinder.

11. In mechanism of the character described, the combination with two alined axially movable toggle actuating members, of concentric relatively slidable sleeves attached one to each of said members, a cylinder inclosing the end of the outer one of said sleeves and fitting snugly over the inner one thereof, opposed pistons slidably mounted in said cylinder and attached one to each of said sleeves, resilient means normally tending to move said pistons together, and means for effecting the admission of fluid pressure to, and its exhaust from, said cylinder between said pistons, thereby moving the same apart.

12. In mechanism of the character described, the combination with two alined axially movable toggle actuating members, of concentric relatively slidable sleeves attached one to each of said members, a cylinder inclosing the end of the outer one of said sleeves and fitting snugly over the inner one thereof, opposed pistons slidably mounted in said cylinder and attached one to each of said sleeves, resilient means normally tending to move said pistons together, the inner of said sleeves having ports opening into said cylinder between said pistons, and means for admitting fluid pressure to said inner sleeve and exhausting the same therefrom.

13. In an expanding mandrel, the combination of a casing bearing radially movable segmental blocks, a sleeve attached to said casing and bearing a driving gear therefor, and means for expanding said blocks, said means including relatively axially movable, concentric sleeves slidably mounted within said first-named sleeve and toggle mechanism connected to said blocks and operable to expand the same upon relative axial movement of said last-named sleeves.

Signed by me, this 13th day of November, 1915.

FRANK J. SCHUMANN.

Attested by—
D. T. DAVIES,
HORACE B. FAY.